Nov. 9, 1965    J. H. JACOBSEN    3,216,475
SELF SEALING AND LUBRICATING CUTTING NUT AND LOCKING WASHER
Filed March 25, 1963

INVENTOR.
Jens H. Jacobsen

United States Patent Office 3,216,475
Patented Nov. 9, 1965

3,216,475
SELF SEALING AND LUBRICATING CUTTING
NUT AND LOCKING WASHER
Jens H. Jacobsen, Mac's Trailer Court, Main Ave.,
Fairview, Nova Scotia, Canada
Filed Mar. 25, 1963, Ser. No. 267,441
1 Claim. (Cl. 151—15)

This invention relates to improvements in nuts and locking washers and more particularly to improvements in cutting nuts and locking washers which contain sealing and lubricating means.

In general use, nuts which are installed upon bolts, studs and the like often become jammed thereon, chiefly due to corrosion, with the result that upon the nut being removed, the bolt or stud is often sheared off by the excessive torque applied in unscrewing the nut. This is most acute in automotive and allied trades where, in addition to corrosion, the threads of the bolts and the like also are likely to become clogged with grit and other foreign material. One outstanding example of the latter situation lies in the maintenance and repair of trucks and other machinery associated with the mixing and transportation of cement or concrete, where the nuts and bolts become encased in solidified cement or the like, the damage to bolts, studs and the like during nut removal resulting in even minor repairs becoming costly and time consuming.

It is, therefore, a primary object of the instant invention to provide a cutting nut and locking washer which, as well as performing the duties of a lock nut and locking washer, also seal the threads of the nut, and the relevant threads of the bolt or the like upon which it is installed, against the ingress of moisture and other foreign matter.

It is another object of my invention to provide a cutting nut and locking washer, the cutting nut portion of which is adapted to clean and clear the threads of the bolt or the like upon removal therefrom, and simultaneously to lubricate the clear threads to facilitate the removal of the principal nut therefrom.

Still a further object of the invention is to provide a cutting nut and locking washer which, when fully and correctly installed, provides a seal at the point of emergence of the bolt from the supporting framework.

Other important objects of the instant invention are that the nut and bolt assemblies are re-usable many times over and in many cases the amount of time and labour saved is quite considerable.

These and other objects and features of the invention will become apparent when the following description is read in conjunction with the drawings, in which.

Figure 1:
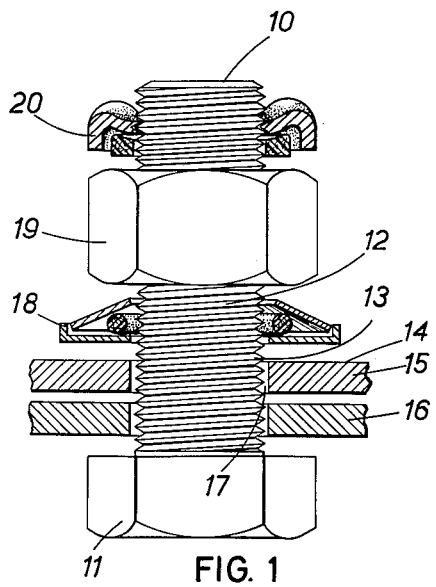
FIG. 1 is a sectional side elevation of a nut and bolt assembly, including a cutting nut and locking washer of the present invention, all loosely assembled, prior to tightening.

Referring to FIG. 1, a conventional bolt 10 having a head 11 and shank 12, in which screw threads 13 are formed, is illustrated passing through a framework 14 comprising two plate members 15 and 16, a clearance hole 17 being formed through members 15 and 16 to permit shank 12 to pass freely therethrough.

A lock washer assembly 18 is installed first upon shank 12, followed by a conventional plain nut 19, and a cutting nut assembly 20 being threaded onto shank 12 after installation of nut 19 thereon.

Figure 2:
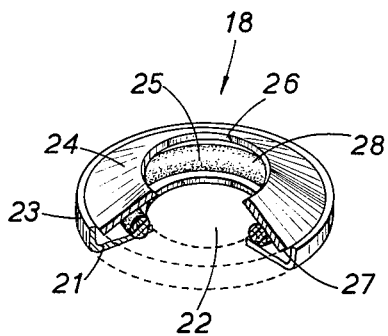
FIG. 2 is a part cut away perspective view of a locking washer of the present invention.

Referring also to FIG. 2, lock washer assembly 18 includes a disc-like base plate 21 having a centre hole 22 therethrough to permit its assembly over shank 12 and a peripheral flange 23 extending outwardly from plate 21. A frusto-conical washer 24 having a centre hole 25 therethrough in axial alignment with hole 22 of plate 21 is installed on base plate 21, the inner edge 26 defining hole 22 being most remote from plate 21 while the outer edge 27 rests on plate 21 inwardly of and adjacent to flange 23.

A toroidal seal 28 is contained between the inner surfaces of base plate 21 and washer 24 and, in the uncompressed state, is a free fit over shank 12, being coaxial with holes 22 and 25 in plate 21 and washer 24 respectively.

Figure 3:
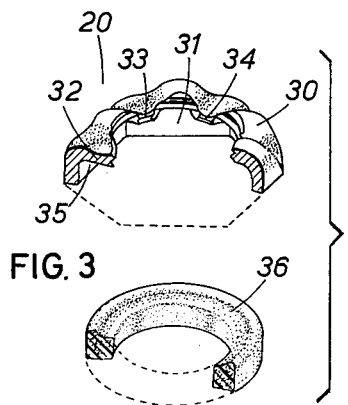
FIG. 3 is an exploded, part cut away perspective view of a cutting nut and its associated seal.

Referring to FIGS. 1 and 3, cutting nut assembly 20 includes a cutting nut 30 having six side walls 31 forming a hexagonal tube, open at the bottom and having an inwardly extending flange 32 at the upper end thereof.

The inner edge 33 of flange 32 is of a regular, undulating shape, thereby forming a plurality of lips 34. In a preferred embodiment of my invention there are twelve of such lips 34, all equally spaced apart, and each having its edges sharpened to the contour of threads 13 and adapted to mate with threads 13 upon nut 30 being assembled to shank 12. Nut 30 is formed of a hard, tough material such as, for instance, stainless steel, so that lips 34 are sufficiently strong to cut through any foreign material which may be attached to threads 13.

Side walls 31 and flange 32 form a housing 35 and a seal 36 is provided to fit closely therewithin, the inner diameter of seal 36 being greater than the crest diameter of shank 12. For ease of manufacture, seal 36 may be circular and its maximum diameter is, of course, substantially the same as the internal distance across the flats of nut 30.

Figure 4:
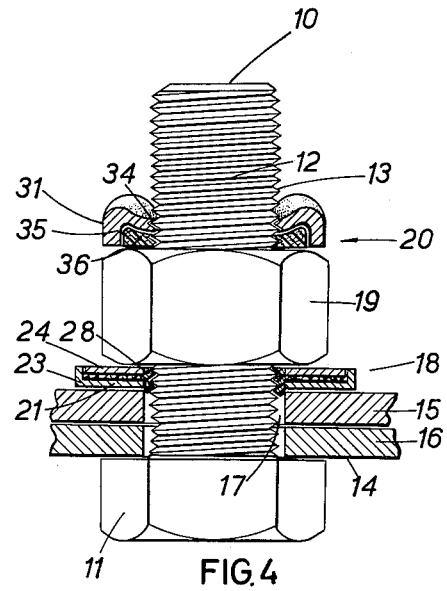
FIG. 4 is a view similar to that of FIG. 1, illustrating the sealing and locking action of the locking washer and cutting nut upon the complete assembly being tightened correctly.

Referring now to FIG. 4, nut 19 has been tightened on bolt 10, drawing head 11 hard against framework 14 and compressing lockwasher assembly 18 against the opposite side of framework 14.

Conical washer 24 has been caused to collapse and assume a substantially flat configuration and the pressure exerted between washer 24 and the face of nut 19 holds the latter in a friction lock on shank 12. At the same time, seal 28, which is preferably of an asbestos/graphite semi-solid material, is compressed between base plate 21 and conical washer 24, the flange 23 substantially preventing escape of the seal material in an outwardly direction, thereby forcing seal 28 to extrude and fill the gap between washer assembly 18 and shank 12, including filling the threads 13 which are in the immediate vicinity.

In this manner, seal 28 effectively prevents the ingress of moisture, dust and the like from the atmosphere to the threads 13 upon which nut 19 is installed, and, furthermore, the clearance hole 17 in framework 14 is effectively sealed in the same action.

After tightening nut 19, the cutting nut assembly 20 is screwed hard down on the outer surface thereof. Nut 20 acts as a lock nut and seal 36, which is of the same or similar material to seal 28 and protrudes below nut 20 in the uncompressed state, is sufficiently compressed to completely fill housing 35 and extrude into the threads 13 which are coincident with cutting nut 20.

It will be noted that this action also effectively seals off the upper end of nut 19 to prevent moisture and the like from filling any minor clearance between nut 19 and the relevant threads 13.

From the foregoing it will be obvious that nut 19 is securely held in threaded engagement with bolt 10 by means of lock washer assembly 18 and cutting nut assembly 20, while corrosion and the like between nut 19 and shank 12 is effectively prevented by the action of seals 28 and 36.

Upon wishing to remove nut 19, the cutting nut 20 is first unscrewed from shank 12, the action of lips 34 being similar to that of a conventional die nut, thereby effectively cleaning any exposed threads 13. Furthermore, by causing its associated seal 36 to move up threads 13 as an integral part of nut 20, some of the material of seal 36 is deposited on the threads 13 to provide a lubricant. After being sealed from corrosive and other deleterious effects, nut 19 is as free a fit on threads 13 as it was when originally installed on bolt 10, and, due to the cleaning and lubricating action of nut 20 as described, may be quickly and easily removed from threads 13 of bolt 10 without causing any damage.

Thus bolt 10 and nut 19 are re-usable indefinitely and this, in itself, represents a great saving to truck fleet operators and the like in addition to the time and money saved in man hours during vehicle servicing.

Upon re-fitting the complete unit after service work has been carried out the conical washer 24 and seals 28 and 36 must, of course, be replaced but this represents only a very small outlay compared with the savings outlined above.

The embodiments of this invention in which an exclusive property or privilege is claimed are defined as follows:

In combination a cutting nut assembly, a locking washer assembly, and a bolt in an assembled relationship; said cutting nut assembly including a cutting nut and a first deformable seal; said cutting nut having an annular recess formed in the face thereof and an undulated inner edge forming a plurality of inwardly extending lips engageable with the thread of said bolt; said first seal being housed within said recess; said locking washer assembly including a centrally perforated base plate of disc like conformation; a flange extending around the peripheral edge of said base plate; a centrally perforated, shallow, frusto-conical, collapsible washer co-operable with said base plate; the outer edge of said collapsible washer contacting the inner surface of said flange upon said washer being compressed towards said base plate; a second deformable seal retained between said base plate and said collapsible washer; said cutting nut assembly and said locking washer assembly in combination with nut means upon said bolt; said locking washer assembly being disposed about said bolt between the head thereof and the driving face of said nut means and said cutting nut assembly being threaded on said bolt to engage said nut means on the side opposite said locking washer assembly; said collapsible washer being flattened upon said nut means being tightened onto it and said second seal being extruded from between said base plate and collapsible washer into the threads of said bolt; and said first seal being extruded from said recess into said threads of said bolt upon said cutting nut being tightened against said nut means.

References Cited by the Examiner
UNITED STATES PATENTS

| | | | |
|---|---|---|---|
| 2,286,667 | 6/42 | Brooke | 151—7 |
| 2,398,377 | 4/46 | Johnston | 151—30 |
| 2,448,232 | 8/48 | Muse. | |
| 2,765,834 | 10/56 | Poupitch. | |
| 3,086,421 | 4/63 | Hamman | 151—38 |

CARL W. TOMLIN, *Primary Examiner.*

EDWARD C. ALLEN, *Examiner.*